United States Patent
Wieland

(10) Patent No.: US 6,219,918 B1
(45) Date of Patent: Apr. 24, 2001

(54) METHOD OF FINISH MACHINING A SPOKED WHEEL RIM

(75) Inventor: Frank Wieland, Chemnitz (DE)

(73) Assignee: Variomatic GmbH & Co. KG, Chemnitz (DE)

( * ) Notice: Subject to any disclaimer, the term of this patent is extended or adjusted under 35 U.S.C. 154(b) by 0 days.

(21) Appl. No.: 09/435,757

(22) Filed: Nov. 8, 1999

(30) Foreign Application Priority Data

Sep. 16, 1999 (DE) ............................................... 199 44 568

(51) Int. Cl.⁷ ...................................................... B21D 53/26
(52) U.S. Cl. .......................... 29/894.34; 29/27 C; 82/122; 409/165; 409/166; 409/216; 451/61
(58) Field of Search .................... 29/894.34, 894.344, 29/894.345, 27 C; 72/80, 102; 82/122; 409/165, 166, 216; 451/61, 51

(56) References Cited

U.S. PATENT DOCUMENTS 5,664,308 * 9/1997 Deitert ................................. 409/216
6,155,758 * 12/2000 Wieland et al. ..................... 409/216

FOREIGN PATENT DOCUMENTS 196 36 100   3/1998  (DE) .

* cited by examiner

Primary Examiner—P. W. Echols
(74) Attorney, Agent, or Firm—Herbert Dubno; Andrew Wilford

(57) ABSTRACT

A spoked wheel rim having a hub defining an axis, a plurality of spokes projecting radially from the hub, and a rim ring attached to outer ends of the spokes is machined by first mounting it in a loading/unloading station into a holder rotatable about a holder axis with the rim axis generally coaxial with the holder axis. Then the holder is orbited by a turntable carrying the holder from the loading/unloading station into a working station angularly offset relative to the loading/unloading station about a turntable axis between the stations. A rotating tool is then displaced by means of a head carried on a hexapod positioner at least over surfaces of the spokes while holding the rim stationary in the working station to machine the surfaces. The rim is then continuously rotated about the holder axis in the working station while engaging a rotating tool carried on the hexapod positioner with an edge of the rim ring to machine the edge.

6 Claims, 3 Drawing Sheets

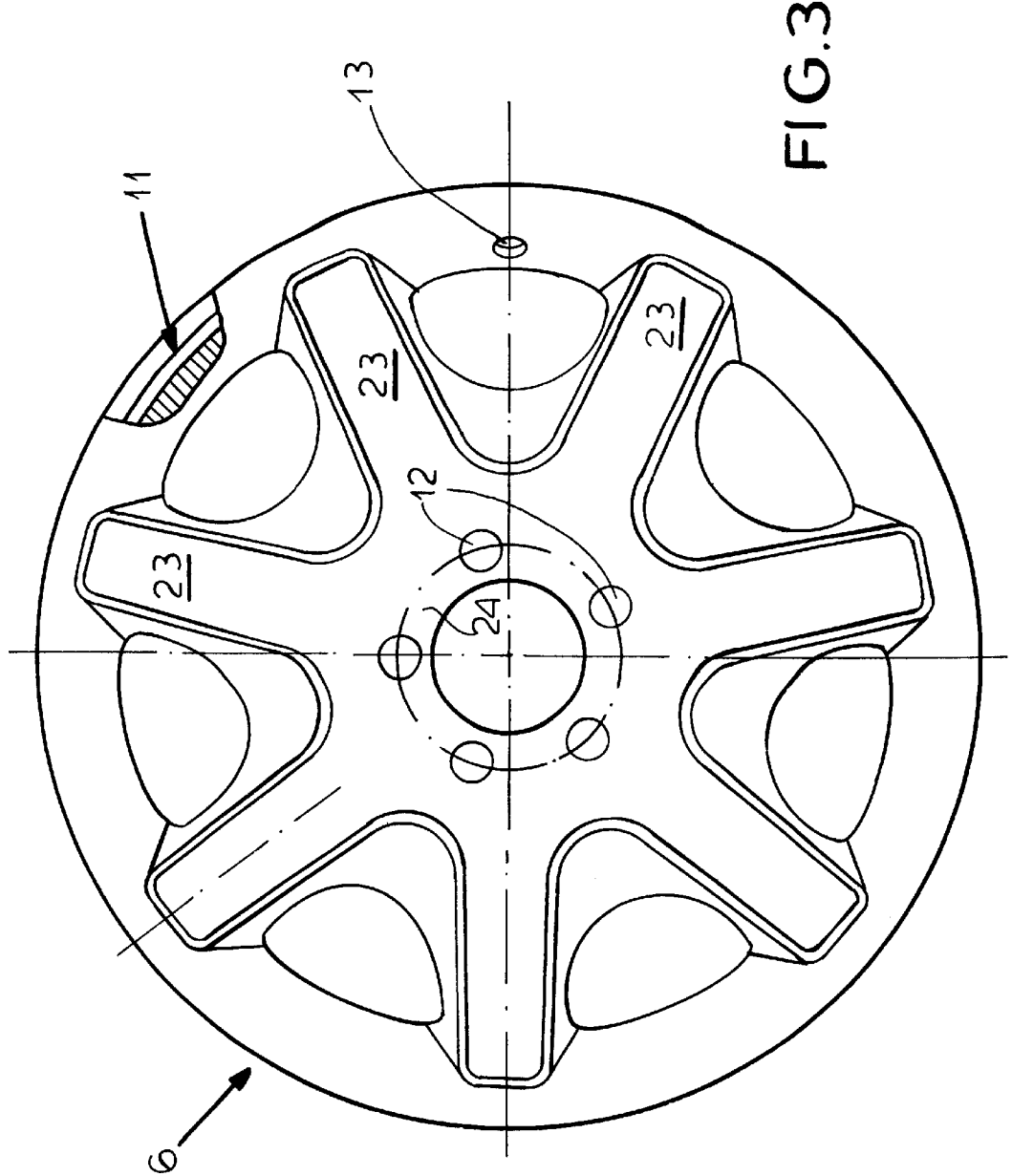

METHOD OF FINISH MACHINING A SPOKED WHEEL RIM

FIELD OF THE INVENTION

The present invention relates to the manufacture of a spoked wheel rim. More particularly this invention concerns the finish machining of such a rim.

BACKGROUND OF THE INVENTION

A standard one-piece spoked wheel rim comprises a center hub formed with lug holes for attachment to the vehicle, a plurality of spokes extending radially from the hub, and an outer ring on which the tire is mounted. Such a wheel hub is typically cast of an aluminum alloy and then machined to shine and smooth the spokes, to form accurate circular outer edges for holding the tire, and to provide accurately positioned and sized lug and valve holes.

While it has been suggested to use some automatic machining tools to do parts of the finish machining of such a workpiece, it is standard to do the final smoothing, the removal of parting lines from the mold, and all the boring in manual steps. Furthermore since the outer edges of the rim must be cut to very high tolerances, it is standard to mount the rim in a separate lathe that serves solely to perform this machining operation.

OBJECTS OF THE INVENTION

It is therefore an object of the present invention to provide an improved method of finish machining a spoked wheel rim.

Another object is the provision of such an improved method of finish machining a spoked wheel rim which overcomes the above-given disadvantages, that is which simplifies the finish machining and that largely eliminates the need for manual operations.

SUMMARY OF THE INVENTION

A spoked wheel rim having a hub defining an axis, a plurality of spokes projecting radially from the hub, and a rim ring attached to outer ends of the spokes is machined by first mounting it in a loading/unloading station into a holder rotatable about a holder axis with the rim axis generally coaxial with the holder axis. Then the holder is orbited by a turntable carrying the holder from the loading/unloading station into a working station angularly offset relative to the loading/unloading station about a turntable axis between the stations. A rotating tool is then displaced by means of a head carried on a hexapod positioner at least over surfaces of the spokes while holding the rim stationary in the working station to machine the surfaces. The rim is then continuously rotated about the holder axis in the working station while engaging a rotating tool carried on the hexapod positioner with an edge of the rim ring to machine the edge.

Thus with this system all the machining operations are carried out while the rim workpiece is held in the rotatable holder, without having to dechuck it. The spoke and other surfaces can be machined and then the rim edge all in succeeding operations, with one done before or after the other, by means of rotary tools carried on a hexapod positioner such as described in German patent document 196 36 100. Such a hexapod positioner can accurately position a machine tool and its rotary drive so as to By finish even very complex shaped surfaces.

According to the invention the tool is changed after machining the surfaces of the spokes. This can be done by using a turret-type system holding a plurality of different tools that are rotated through the drive, or by an automatic chucking/dechucking device.

In accordance with the invention a plurality of holes are drilled through the rim while it is stationary in the working station with a rotary tool. Thus the lug and valve-stem holes can also be formed or fully shaped with the system of this invention.

The turntable according to the invention has a pair of such holders. A fresh unfinished rim is loaded into the holder in the loading/unloading station while machining the rim in the other holder in the working station. Similarly a finished rim can be taken out of the holder in the loading/unloading station by means of an automatic unloading device.

Normally in accordance with the invention the surfaces of the spokes are machined in a plurality of separate operations during each of which the rim is stationary. To this end the rim is displaced angularly about the holder axis in the working station through a partial revolution between succeeding operations. If there are six spokes, the rim is indexed angularly through 60° after each surface-machining operation, so that the hexapod positioner need only be effective over a small sector of the working station.

The position of the rim on the holder is sensed automatically and the holder is then angularly displaced to place the rim in the holder into a predetermined angular position. Thus the detected position is used as an actual value that is compared to a set point to ensure that at the workpiece is angularly properly positioned.

BRIEF DESCRIPTION OF THE DRAWING

The above and other objects, features, and advantages will become more readily apparent from the following description, reference being made to the accompanying drawing in which:

FIG. 3 is a view of a spoked wheel rim in accordance with the invention.

SPECIFIC DESCRIPTION

Figure 1:
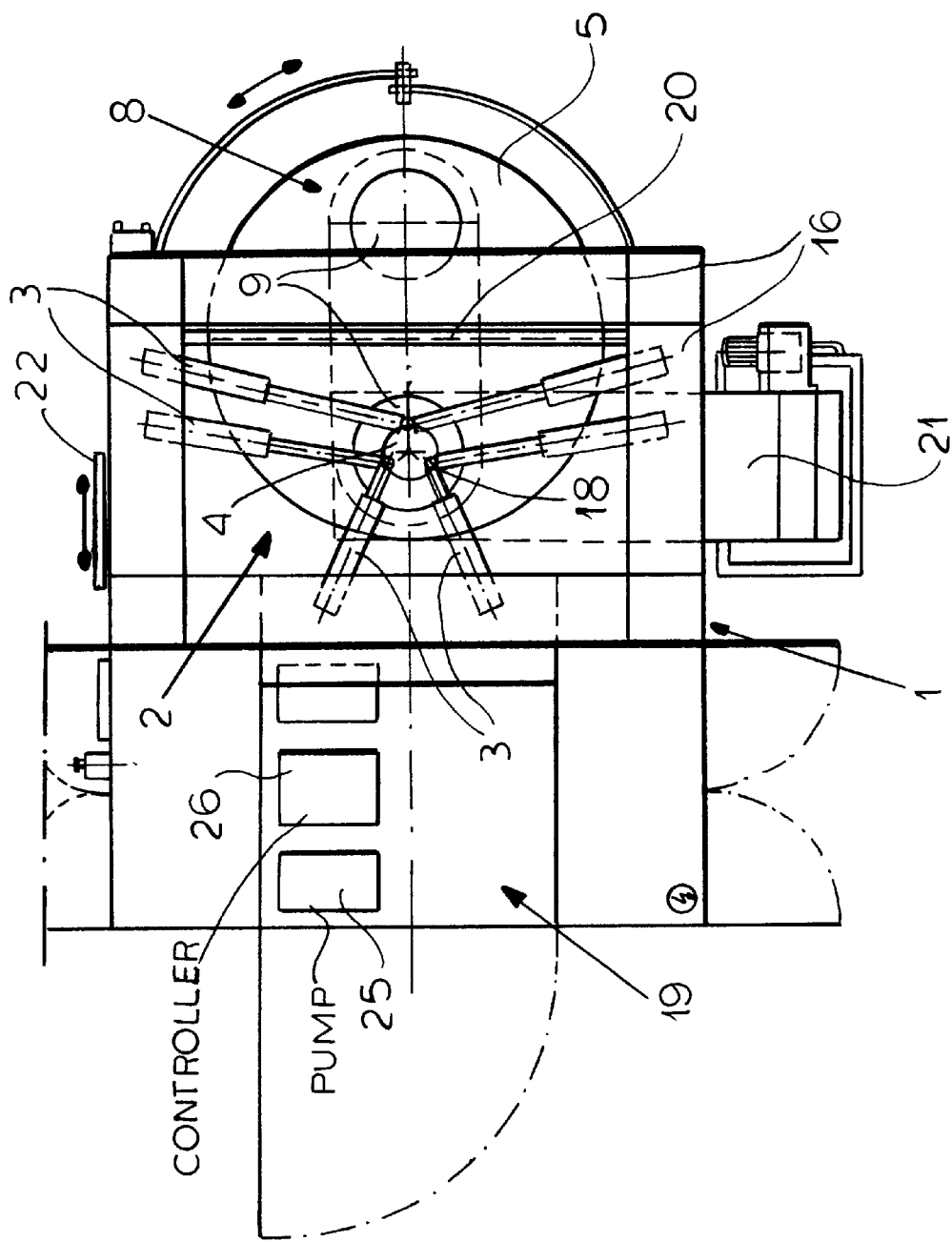
FIG. 1 is a small-scale top view of an apparatus for carrying out the method of this invention.
Figure 2:
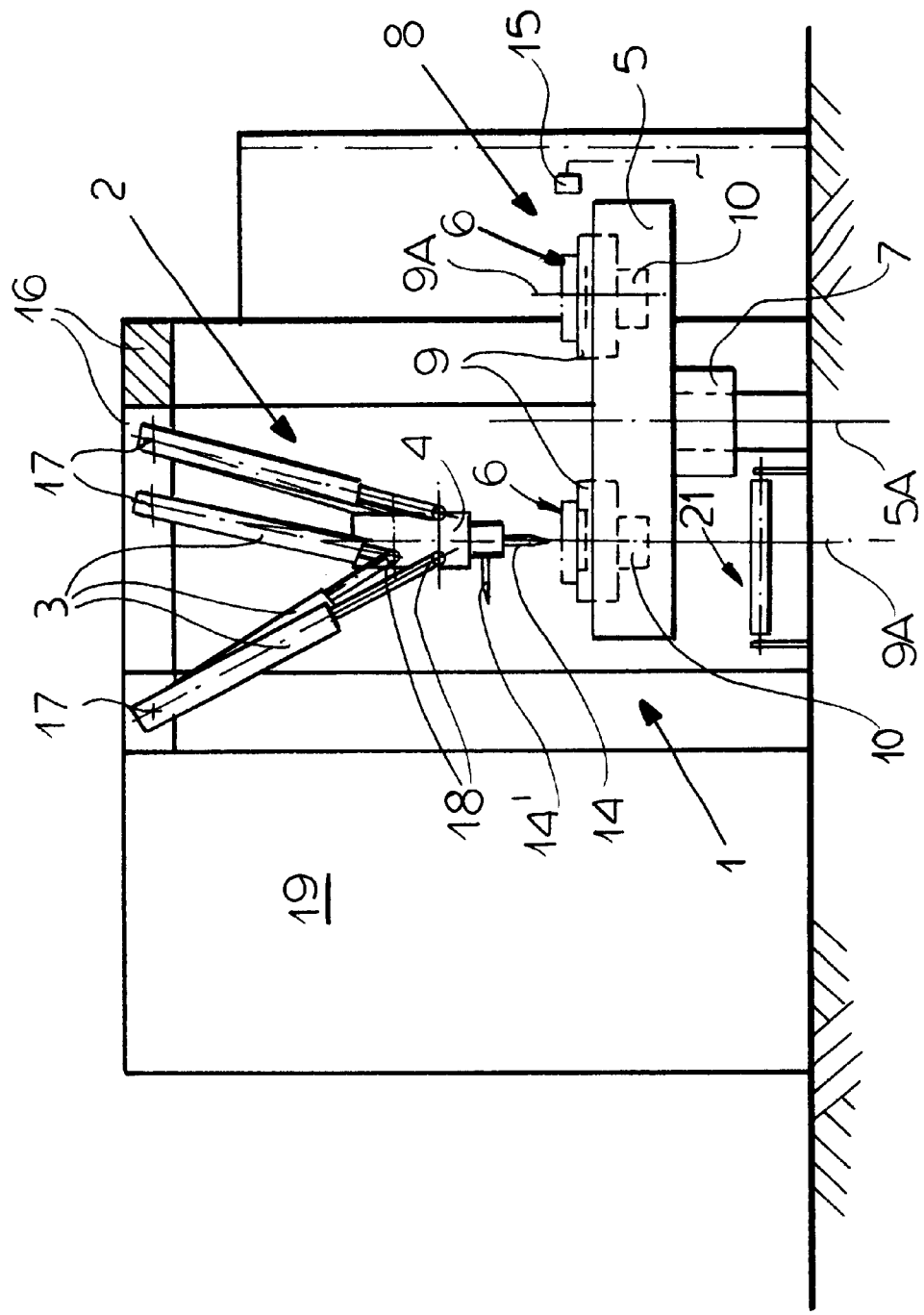
FIG. 2 is a vertical section through the apparatus.

As seen in FIGS. 1 and 2 a finishing machine 1 has a relatively small work station 2 in which is movable a rotary machine tool 14 carried on a positioning head 4 itself mounted at the lower end of six struts 3 of a hexapod positioner. A turntable 5 pivotal about an upright axis 5A offset from the station 2 by a drive 7 carries two holders 9 rotatable by respective drives 10 about respective upright axes 9A parallel to the axis 5A. Each holder 9 carries a respective workpiece constituted by a spoked wheel-rim casting 6 having as shown in FIG. 3 an outer ring 11 formed with a valve hole 13, seven radially extending spokes 23, and a central hub 24 formed with five lug holes 12. Outside the machine 1 is a loading/unloading station 8 through which the holders 9 can be moved by the turntable 5.

The machine 1 has a square upper frame 16 on whose side and back elements the upper ends of the struts 3 are pivoted at 17. The lower ends are pivoted at 18 at two vertically offset planes on the head 4 so that as is known the head 14 can be accurately and solidly positioned anywhere in the station 2 with an axis 14A of the rotary tool 14 oriented perfectly vertically or at an angle to the vertical. The machine 1 has a part 19 housing the pump 25 and controller 26 for the struts 3 and for the drives 7 and 10. Underneath the station 2 is a conveyor 21 for carrying off chips and at one side is an access door 22. A door 20 can be lowered to close off the work station 2. A sensor 15 in the station 8 detects the position of the turntable 5.

With this system a rim casting 6 is loaded onto one of the holders 9 in the station 8 and its position is verified by the position sensor 15 to ensure that it is properly centered on the respective axis 6A, any corrections being made to its angular position at this time. Then the turntable 5 is rotated through 180° to position the workpiece 6 in the working station 2. Meanwhile a finished such workpiece 6 can be removed from the other holder 6 and replaced with an unfinished one.

In the station 2 the tool 14 is moved to finish machine one sector of the blank 6 while it is stationary. In the illustrated system with seven spokes 23 the tool 14 only works on a sector equal to one-seventh or about 51° of the workpiece 6, after which it is moved up out of the way, the workpiece 6 is indexed through one-seventh of a revolution, and then the next sector is machined and so on until the entire workpiece 6 has been finish machined. Then the workpiece 6 is moved about in five uniform steps while the five lug holes 12 are drilled, and it is positioned for the tool 14 to similarly drill the valve-stem hole 13.

After these operations are complete the same tool 14, or a different tool 14' which can be swapped for the tool 14, is positioned at one of the outer edges 11 and the drive 10 rotates the workpiece 6 so that this edge 11 can be machined, then moved down so the other bead edge 11 can be machined. This completes all the machining work on the workpiece 6 which can then be rotated out to the loading/unloading station 8 and replaced with an unfinished workpiece.

I claim:

1. A method of machining a spoked wheel rim having a hub defining an axis, a plurality of spokes projecting radially from the hub, and a rim ring attached to outer ends of the spokes, the method comprising the steps of:

mounting the spoked wheel rim in a loading/unloading station into a holder rotatable about a holder axis with the rim axis generally coaxial with the holder axis;

orbiting the holder by means of a turntable carrying the holder from the loading/unloading station into a working station angularly offset relative to the loading/unloading station about a turntable axis between the stations;

displacing a rotating tool by means of a head carried on a hexapod positioner at least over surfaces of the spokes while holding the rim stationary in the working station to machine the surfaces; and rotating the rim about the holder axis in the working station while engaging a rotating tool carried on the hexapod positioner with an edge of the rim ring to machine the edge.

2. The rim-machining method defined in claim 1, further comprising the step of changing the tool after machining the surfaces of the spokes.

3. The rim-machining method defined in claim 1, further comprising the step of drilling a plurality of holes through the rim while it is stationary in the working station with a rotary tool.

4. The rim-machining method defined in claim 1 wherein the turntable has a pair of such holders, the method further comprising the step of loading a fresh unfinished rim into the holder in the loading/unloading station while machining the rim in the other holder in the working station.

5. The rim-machining method defined in claim 1, further comprising the steps of machining the surfaces of the spokes in a plurality of separate operations during each of which the rim is stationary and displacing the rim angularly about the holder axis in the working station through a partial revolution between succeeding operations.

6. The rim-machining method defined in claim 1, further comprising the step of sensing the position of the rim on the holder and angularly displacing the holder to place the rim in the holder into a predetermined angular position.

* * * * *